United States Patent Office 3,496,194
Patented Feb. 17, 1970

3,496,194
PROCESS FOR THE SEPARATION OF GIBBERELLINS
George Wynne Elson and Andrew Robert Peterson, Macclesfield, England, assignors to Imperial Chemical Industries Limited, London, England, a corporation of Great Britain
No Drawing. Filed Oct. 9, 1967, Ser. No. 673,948
Claims priority, application Great Britain, Nov. 3, 1966, 49,367/66
Int. Cl. C07d 5/40
U.S. Cl. 260—343.3      2 Claims

ABSTRACT OF THE DISCLOSURE

A process for the separation of gibberellic acid from a mixture comprising gibberellic acid together with gibberellin $A_4$ and/or gibberellin $A_7$ by partition of the mixture between an aqueous phase at pH 4–8.5 and an organic phase comprising esters, ketones or alcohols containing not more than 10 carbon atoms. The products obtained by the separation are known to possess plant growth regulating properties.

---

This invention relates to a separation process, and more particularly, it relates to a process for the separation of gibberellic acid from a mixture comprising gibberellic acid together with gibberellin $A_4$ and/or gibberellin $A_7$.

The invention is based on the unexpected discovery that the partition coefficients of gibberellic acid and of gibberellin $A_4$ and/or gibberellin $A_7$ between certain organic solvents and an aqueous phase, whose pH is between 4 and 8.5, are sufficiently different to permit the separation of gibberellic acid from gibberellin $A_4$ and/or gibberellin $A_7$. As an illustration of this difference, the partition coefficients and extraction coefficients of gibberellic acid and gibberellin $A_7$ between various solvents and various aqueous buffer solutions at 23° C. are given below.

SOLVENT: ETHYL ACETATE

| pH of aqueous phase | Partition coefficients | | Extraction coefficients | |
|---|---|---|---|---|
|  | Gibberellic acid | Gibberellin $A_7$ | Gibberellic acid | Gibberellin $A_7$ |
| 2.0 | 4.55 | 4.72 | 6.57 | 6.57 |
| 2.5 | 4.33 | 4.58 | 6.09 | 6.57 |
| 3.0 | 3.59 | 4.33 | 4.95 | 6.09 |
| 3.5 | 2.50 | 4.09 | 3.10 | 5.67 |
| 4.0 | 1.61 | 3.78 | 1.80 | 5.58 |
| 4.5 | 0.73 | 3.69 | 0.81 | 4.93 |
| 5.0 | 0.26 | 3.19 | 0.29 | 4.13 |
| 5.5 | 0.10 | 2.45 | 0.11 | 3.02 |
| 6.0 | 0.02 | 1.63 | 0.03 | 1.91 |
| 6.5 |  | 0.85 |  | 0.94 |
| 7.0 |  | 0.35 |  | 0.38 |
| 7.5 |  | 0.13 |  | 0.14 |
| 8.0 |  |  |  | 0.05 |

SOLVENT: n-BUTANOL

|  | Extraction coefficients | |
|---|---|---|
|  | Gibberellic acid | Gibberellin $A_7$ |
| pH of aqueous phase: |  |  |
| 2.0 | 3.76 | 7.0 |
| 2.5 | 3.70 | 7.0 |
| 3.0 | 3.44 | 7.0 |
| 3.5 | 2.64 | 7.0 |
| 4.0 | 1.86 | 7.0 |
| 4.5 | 1.13 | 6.69 |
| 5.0 | 0.67 | 5.45 |
| 5.5 | 0.37 | 5.67 |
| 6.0 | 0.25 | 4.88 |
| 6.5 | 0.21 | 4.13 |
| 7.0 | 0.18 | 3.65 |
| 7.5 | 0.18 | 3.17 |
| 8.0 | 0.18 | 2.64 |

SOLVENT: ETHYL METHYL KETONE

|  | Extraction coefficients | |
|---|---|---|
|  | Gibberellic acid | Gibberellin $A_7$ |
| pH of aqueous phase: |  |  |
| 2.0 | 1.22 | 2.17 |
| 2.5 | 1.22 | 2.17 |
| 3.0 | 1.19 | 2.17 |
| 3.5 | 0.87 | 2.17 |
| 4.0 | 0.63 | 2.12 |
| 4.5 | 0.46 | 1.98 |
| 5.0 | 0.32 | 1.56 |
| 5.5 | 0.18 | 1.00 |
| 6.0 | 0.09 | 0.56 |
| 6.5 | 0.08 | 0.33 |
| 7.0 | 0.08 | 0.25 |
| 7.5 | 0.08 | 0.25 |
| 8.0 | 0.08 | 0.25 |

The partition coefficients quoted have been calculated on the ratio:

$$\frac{\text{concentration of solute in the organic phase}}{\text{concentration of solute in the aqueous phase}}$$

and the extraction coefficients quoted have been calculated on the ratio:

$$\frac{\text{percentage of the total solute present in the organic phase}}{\text{percentage of the total solute present in the aqueous phase}}$$

According to the invention we provide a process for the separation of gibberellic acid from a mixture comprising gibberellic acid together with gibberellin $A_4$ and/or gibberellin $A_7$, which comprises partitioning the mixture between an aqueous phase having a pH of between 4 and 8.5 and an organic phase comprising a water-immiscible or partially water-miscible organic solvent selected from the group consisting of esters, ketones and alcohols containing not more than 10 carbon atoms, separating the phases, and then subsequently, if desired, recovering the gibberellin $A_4$ and/or gibberellin $A_7$ from the organic phase.

It is to be understood that the above process produces an organic phase enriched in gibberellin $A_4$ and/or gibberellin $A_7$, and an aqueous phase enriched in gibberellic acid. If it is desired to produce substantially pure gibberellic acid, then it may be necessary to repartition the aqueous phase with a further quantity or quantities of organic phase in order to further reduce the amount of gibberellin $A_4$ and/or gibberellin $A_7$ remaining in the aqueous phase. The pure gibberellic acid may then be recovered from the aqueous phase by known means. Similarly, if substantially pure gibberellin $A_4$ and/or gibberellin $A_7$ is desired, then it may be necessary to repartition the organic phase with a further quantity or quantities of aqueous phase in order to further reduce the amount of gibberellic acid remaining in the organic phase.

It is to be further understood that the above process does not effect a separation of gibberellin $A_4$ from gibberellin $A_7$, and when both of these components are present in the initial mixture, then a mixture of gibberellin $A_4$ and gibberellin $A_7$ is recovered from the organic phase. When only one of these components is present in the initial mixture, then only that component is recovered from the organic phase.

While the process of the invention is effective when the pH of the aqueous phase is between 4 and 8.5, if the pH of the aqueous phase is near 4, then in order to obtain substantially pure gibberellic acid or gibberellin $A_4$ and/or gibberellin $A_7$, the process of partition and separation of the phases may have to be repeated several times depending upon the relative concentration of gibberellic acid and gibberellin $A_4$ and/or gibberellin $A_7$ in the initial mixture. Also, if the pH of the aqueous phase is near 8.5, the amount of gibberellin $A_4$ and/or gibberellin $A_7$ present in the organic phase is relatively small, and thus to secure a substantial yield of gibberellin $A_4$ and/or gibberellin $A_7$, the process of the invention may have to be repeated several times. Accordingly, a preferred process comprises partitioning the mixture of gibberellic acid together with gibberellin $A_4$ and/or gibberellin $A_7$ between an aqueous phase having a pH of between 4.4 and 5.5 and an organic phase as hereinbefore defined, and separating the phases.

As suitable water-immiscible or partially water-miscible organic solvents which are esters, ketones or alcohols of not more than 10 carbon atoms, there may be mentioned, for example ethyl acetate, n-butyl acetate, methyl ethyl ketone, methyl n-propyl ketone, n-butanol and n-amyl alcohol, and of these, the preferred solvents are ethyl acetate and n-butanol.

As a suitable procedure for recovering the gibberellic acid from the aqueous phase there may be mentioned, for example, adjusting the pH of the aqueous phase to between 2.0 and 2.5, then extracting the aqueous phase with a water-immiscible or partially water-miscible organic solvent as defined above, for example ethyl acetate, and recovering the gibberellic acid from the organic solvent by evaporation. Similarly, the gibberellin $A_4$ and/or gibberellin $A_7$ may be recovered from the organic phase by evaporation of the solvent. In each case, the final products may be further purified, if desired, by recrystallisation.

The process of the invention may be used, for example, to separate gibberellin $A_4$ and/or gibberellin $A_7$ from an aqueous solution containing these components together with gibberellic acid, or the process may be used to separate gibberellic acid from a solution containing gibberellic acid together with gibberellin $A_4$ and/or gibberellin $A_7$ in a water-immiscible or partially water-miscible organic solvent as defined above. The process of the invention is therefore useful for the isolation of a mixture of gibberellin $A_4$ and gibberellin $A_7$ from a culture filtrate of *Gibberella fujikuroi* which contains gibberellic acid together with gibberellin $A_4$ and gibberellin $A_7$, or from a solution of gibberellic acid and gibberellin $A_4$ and gibberellin $A_7$ in an organic solvent, for example the mother liquors remaining after impure gibberellic acid, extracted from a culture filtrate of *Gibberella fujikuroi*, has been crystallised from such an organic solvent.

The invention is illustrated but not limited by the following examples:

EXAMPLE 1

1000 ml. of a culture filtrate of the fungus *Gibberella fujikuroi* containing 350 mg. of gibberellic acid and 220 mg. gibberellin $A_7$ and approximately 90 mg. gibberellin $A_4$ is adjusted to pH 4.4 by the addition of dilute hydrochloric acid. The filtrate is extracted with 300 ml. of ethyl acetate to give an extract rich in gibberellins $A_7$ and $A_4$. The extracted filtrate is adjusted to pH 2.0 by the addition of dilute hydrochloric acid and again extracted with 300 ml. of ethyl acetate to give an extract rich in gibberellic acid. The gibberellin $A_7$ and $A_4$ rich extract is dried and shaken with 3 gm. activated carbon. The carbon is removed by filtration, and the ethyl acetate evaporated from the filtrate under reduced pressure at 36° C. The solid residue is crystallised from 2 parts of ethyl acetate and 10 parts of diethyl ether at −20° C. There is thus obtained a mixture containing 71% of gibberellin $A_7$ and 27% of gibberellin $A_4$ (impurities 2%) M.P. 184.5–186° C. The gibberellic acid rich extract is treated in the same way, and the solid residue crystallised from ethyl acetate. There is thus obtained gibberellic acid, M.P. 230.5–232° C.

EXAMPLE 2

To 1000 ml. of a culture filtrate of the fungus *Gibberella fujikuroi* containing 350 mg. gibberellic acid and 220 mg. gibberellin $A_7$ and approximately 90 mg. gibberellin $A_4$ is added 150 g. sodium chloride. The solution is adjusted to pH 2.0 by the addition of dilute hydrochloric acid and extratced with 333 ml. ethyl acetate. The ethyl acetate extract is extracted with 333 ml. pH 7.5 buffer solution in two equal portions. The buffer solution is prepared by dissolving 22.4 g. potassium hydroxide and 12.0 ml. 88% phosphoric acid in 1000 ml. water. The buffer extract is adjusted to pH 5.0 by the addition of dilute hydrochloric acid, and extracted with 100 ml. ethyl acetate to give a gibberellin $A_7$ and $A_4$ rich extract. The extracted buffer solution is adjusted to pH 2.0 by the addition of dilute hydrochloric acid and extracted with 100 ml. ethyl acetate to give a gibberellic acid rich extract. Subsequent treatment of the gibberellin acid rich extract. gibberellic acid rich extracts is as described in Example 1.

Example 3

1000 ml. of ethyl acetate containing 700 mg. gibberellic acid and 420 mg. gibberellin $A_7$ and approximately 100 mg. gibberellin $A_4$ is extracted with 1000 ml. of pH 4.0 buffer solution in two equal portions. The buffer solution is prepared by dissolving 1.09 grams dibasic sodium phosphate and 1.29 grams citric acid in 1000 ml. water. The ethyl acetate solution is dried and shaken with 3 gm. activated carbon. The carbon is removed by filtration, and the ethyl acetate evaporated from the filtrate under reduced pressure at 36° C. The solid residue is crystallised from 2 parts of ethyl acetate and 10 parts of diethyl ether at −20° C. There is thus obtained gibberellins $A_7$ and $A_4$. The buffer solution is adjusted to pH 2.0 by the addition of dilute hydrochloric acid and extracted with 600 ml. ethyl acetate in two equal portions. The extract is dried and shaken with 2 gm. activated carbon. The carbon is removed by filtration, and the ethyl acetate evaporated from the filtrate under reduced pressure at 360 C. The solid residue is crystallised from ethyl acetate. There is thus obtained gibberellic acid, M.P. 230.5–232° C.

What we claim is:
1. A process for the isolation of gibberellin $A_4$ or gibberellin $A_7$ or a mixture thereof from a mixture comprising gibberelic acid together with gibberellin $A_4$ and/or gibberellin $A_7$ which comprises partitioning the mixture between an aqueous phase having a pH of between 4 and 8.5 and an organic phase comprising a compound selected from the group consisting of ethyl acetate, n-butyl acetate, methyl ethyl ketone, methyl n-propyl ketone, n-butanol and n-amyl alcohol, separating the phases, and then subsequently recovering the gibberellin $A_4$ and/or gibberellin $A_7$ from the organic phase.

2. A process as claimed in claim 1 wherein the pH of the aqueous phase is between 4.4 and 5.5.

References Cited
Weissberger, vol. III, 2nd edition, Part I, Separation and Purification, pp. 149–395.

ALEX MAZEL, Primary Examiner

ANNE MARIE J. TIGHE, Assistant Examiner

U.S. Cl. X.R.

71—89